United States Patent [19]

Kobayashi

[11] Patent Number: 5,152,496
[45] Date of Patent: Oct. 6, 1992

[54] LOCK STRUCTURE FOR VEHICLE MOUNTED TYPE ELECTRONIC EQUIPMENT

[75] Inventor: Shigetoshi Kobayashi, Warabi, Japan

[73] Assignee: Clarion Co., Ltd., Tokyo, Japan

[21] Appl. No.: 640,048

[22] Filed: Jan. 9, 1991

[30] Foreign Application Priority Data

Jan. 10, 1990 [JP] Japan .................................. 2-552

[51] Int. Cl.⁵ ............................................. E05B 65/00
[52] U.S. Cl. .................................... 248/551; 248/27.1; 70/58
[58] Field of Search ............ 248/551, 27.1, 27.3, 248/552, 553; 70/58, 258

[56] References Cited

U.S. PATENT DOCUMENTS

4,947,661  8/1990  Yoshida .................... 248/551 X

*Primary Examiner*—Alvin C. Chin-Shue
*Attorney, Agent, or Firm*—Price, Gess & Ubell

[57] ABSTRACT

A lock structure for a vehicle-mounted type of electronic equipment capable of facilitating the mounting of the electronic equipment on a vehicle and positively locking the electronic equipment with respect to a vehicle. The lock structure includes an equipment lock mechanism, an elastic member for urging the equipment lock mechanism in the direction of a holding section on the side of a vehicle, and an equipment lock release mechanism provided on a handle so as to force the equipment lock mechanism in the released direction when the handle is pivotally moved to a substantially horizontal position.

12 Claims, 7 Drawing Sheets

LOCK STRUCTURE FOR VEHICLE MOUNTED TYPE ELECTRONIC EQUIPMENT

BACKGROUND OF THE INVENTION

This invention relates to a lock structure for use on a vehicle-mounted type electronic equipment, and more particularly to a lock structure for locking a vehicle-mounted type electronic component on a vehicle to prevent it from being stolen.

DESCRIPTION OF RELATED ART

In order to cope with a serious problem of vehicle-mounted type electronic being frequently stolen, a vehicle-mounted type electronic equipment has been developed which is so constructed that a body portion of the equipment is detachably mounted on the side of a vehicle. Such a detachable electronic equipment is generally provided with a lock structure for holding the equipment on the vehicle.

Figure 1:
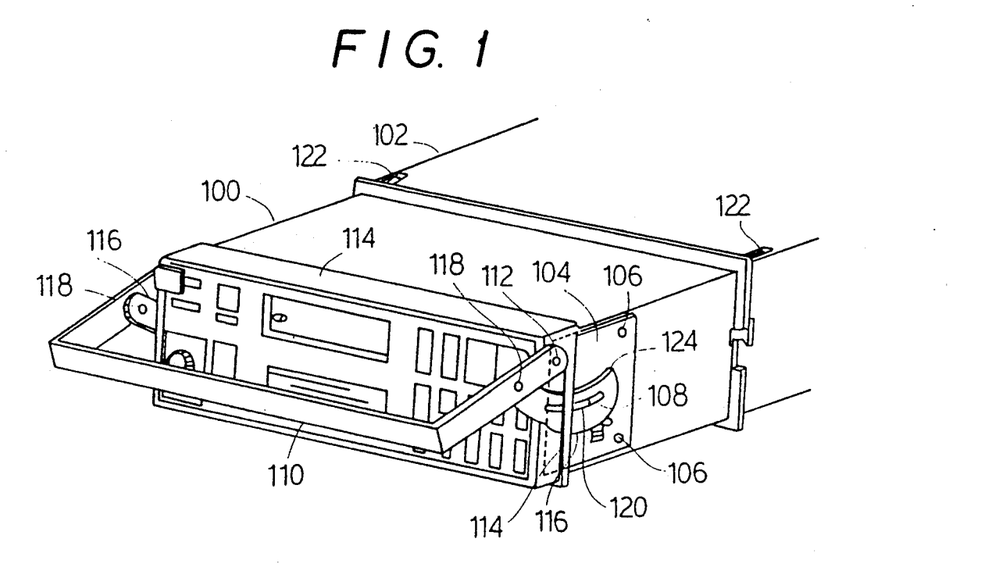
FIG. 1 is a perspective view showing a conventional lock structure for vehicle-mounted type electronic equipment.
Figure 2:
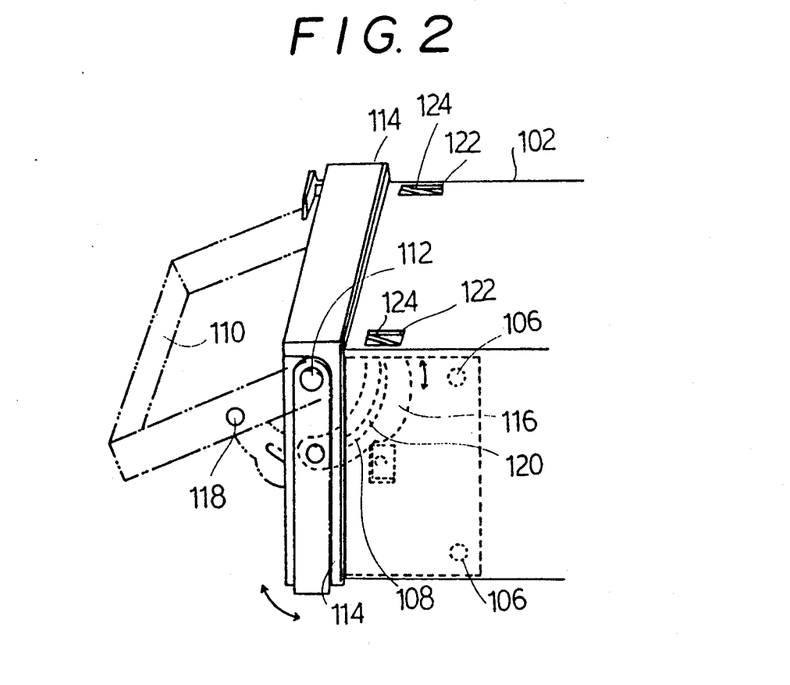
FIG. 2 is a side elevation view showing an essential part of the conventional lock structure shown in FIG. 1.

Such a lock mechanism is typically disclosed in Japanese Utility Model Application Laid-Open Publication No. 149577/1988 and generally constructed in such a manner as shown in FIGS. 1 and 2. More particularly, an electronic equipment such as a car stereo to which the conventional lock structure is applied includes a body 100 detachably mounted in an inner casing 102 arranged on the side of a vehicle such as a car or the like. On both sides of the equipment body 100 are mounted handle mounting plates 104 by means of screws 106. The handle mounting plates 104 each are provided thereon with a position regulating pin 108 in such a manner to outward project therefrom. Also, on the handle mounting plates 104 is pivotally mounted a handle 110 through support pins 112. The handle 110 is formed into a substantially U-like shape and is adapted to be received in a housing frame 114 detachably mounted on the front portion of the equipment body 100. The handle 110 is provided at the portion thereof in proximity to the proximal end of each of both sides thereof with a holding plate 116 of a substantially arcuate shape, which is fixed on the handle 110 by means of a fixing pin 118. The holding plates 116 each are formed with an elongate through-hole 120 of an arcuate shape, through which the position regulating pin 108 outwardly projects or extends. The inner casing 102 is formed on both sides of the upper wall thereof with holding holes 122, into each of which the holding plate 116 is selectively inserted at the distal end thereof as indicated at reference numeral 124.

In the conventional lock structure constructed as described above, when the handle 110 is received in the housing frame 114, the distal ends 124 of the holding plate 116 are engagedly fitted in the holding holes 122 to lock the equipment body 100 with respect to the inner casing 102. This causes a connector (not shown) on the side of the equipment body 100 to be engaged with a connector (not shown) on the side of the inner casing 102, so that the equipment is electrically connected to the vehicle. When it is desired to remove the equipment body 100 from the inner casing 102, the handle 110 is upwardly pivotally moved to release the distal end 124 of each of the holding plates 116 from the holding hole 122. This causes the position regulating pin 108 to abut against one end of the elongate through-hole 120, to thereby regulate the pivotal movement of the handle 110. Then, the handle 110 is forward pulled, resulting in the equipment being removed from the vehicle.

Also, in the conventional lock structure constructed as described above, when the removed equipment body 100 is to be re-mounted in the inner casing 102, it is required to pivotally move the handle 110 to a substantially horizontal position to hold the holding plates 116 at a released position. When only the equipment body 100 is supported, the handle 110 is downward moved to a position near the housed position by gravity, so that the distal end 124 of each of the holding plates 116 upwardly projects from the upper surface of the equipment body 100. Thus, when the equipment body 100 is to be mounted or remounted in the inner casing 102, the distal end 124 of the holding plate 116 abuts against the upper edge portion of the front portion of the inner casing 102, to thereby cause the mounting of the body 100 in the inner casing 102 to fail. Therefore, for the mounting, it is required to insert the equipment body 100 in the inner casing while supporting the equipment body 100 by one hand and supporting the handle 110 by the other hand in a substantially horizontal position.

Thus, the conventional lock mechanism causes the mounting of the equipment on a vehicle to be highly troublesome, so that a user becomes tired of detaching the equipment from the vehicle when he leaves the vehicle, resulting in antitheft being substantially ineffective.

Also, in the conventional lock structure, as described above, the holding plates 116 fixed on the handle 110 carry out the locking of the equipment body 100 of the vehicle, therefore, there is a possibility that even the pivotal movement of the handle 110 in a slight amount often causes the locking to be released. In addition, when vibration transmitted from the vehicle to the handle 110 causes the handle to be oscillated, the attentiveness of a driver is deteriorated, leading to danger.

Figure 3:
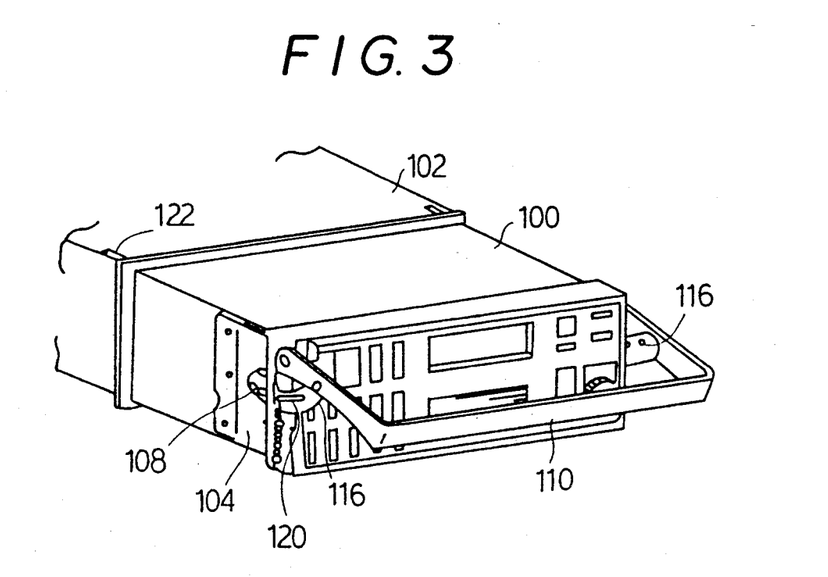
FIG. 3 is a perspective view showing another conventional lock structure for vehicle-mounted type electronic equipment.
Figure 4:
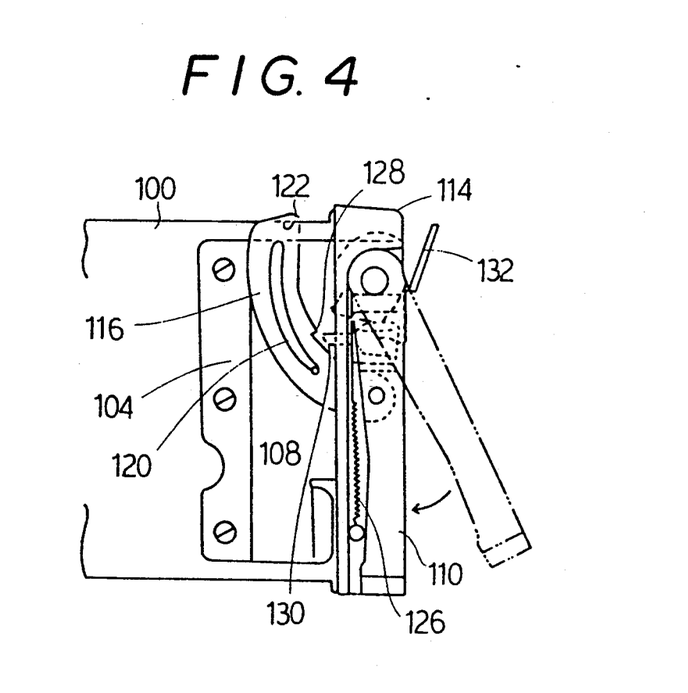
FIG. 4 is a side elevation view showing an essential part of the conventional lock structure shown in FIG. 3.

In order to prevent such undesirable oscillation of the handle, a lock structure for a vehicle-mounted type electronic equipment which is provided with a handle lock/release mechanism for locking a handle to a housed position, is disclosed in Japanese Utility Model Application Laid-Open Publication No. 26884/1989 and generally constructed in such a manner as shown in FIGS. 3 and 4. More particularly, the lock structure includes a handle lock/release mechanism which includes an elastic member 126 attached to a handle 110 for upward forcing the handle 110, a cutout 128 formed at a holding plate 116, a holding member 130 biased so as to be engaged with the cutout 128 and a release member 132 for moving the holding member 130 in a released direction.

The remaining part of the lock mechanism may be constructed in substantially the same manner as the lock mechanism shown in FIGS. 1 and 2.

The so-constructed handle lock/release mechanism shown in FIGS. 3 and 4 permits the holding member 130 to be engaged with the cutout 128 to hold the handle 110 locked when the handle is received in a housing frame 114. This effectively prevents the pivotal movement of the handle 110 due to vibration of a vehicle and the release of the holding plate 116 from a holding hole 122, to thereby prevent the attentiveness of a driver from being deteriorated. The unlocking of the handle 110 is carried out by actuating the release member 132 to move the holding member 130 in the released direction. At this time, the elastic member 126 forces out the released handle 110 to a forward position which permits the handle 110 to be readily grasped, so that it may be pivotally moved.

Unfortunately, the handle lock/release mechanism causes the number of parts for the lock mechanism to be highly increased to lead to an increase in manufacturing costs. Also, the handle lock/release mechanism highly complicates the construction of the lock mechanism and therefore the electronic equipment.

SUMMARY OF THE INVENTION

The present invention has been made in view of the foregoing disadvantages of the prior art.

Accordingly, it is an object of the present invention to provide a lock structure for a vehicle-mounted type electronic equipment which is capable of facilitating the mounting of the electronic equipment on a vehicle.

It is another object of the present invention to provide a lock structure for vehicle-mounted type electronic equipment which is capable of positively locking the electronic equipment with respect to a vehicle.

It is a further object of the present invention to provide a lock structure for vehicle-mounted type electronic equipment which is capable of facilitating the assembling of the lock structure with high efficiency.

It is still another object of the present invention to provide a lock structure for vehicle-mounted type electronic equipment which is capable of preventing an increase in the number of parts, to thereby reduce the manufacturing costs.

It is yet another object of the present invention to provide a lock structure for vehicle-mounted type electronic equipment which is capable of effectively preventing the electronic equipment from being undesirably unlocked from a vehicle.

It is a still further object of the present invention to provide a lock structure for vehicle-mounted type electronic equipment which is capable of accomplishing the above-described objects with a simple construction.

In accordance with the present invention, a lock structure for vehicle-mounted type electronic equipment is provided. The lock structure includes a handle and a handle mounting device for pivotally mounting the handle on the front portion of the vehicle-mounted type electronic equipment. The handle mounting device includes a handle lock/release mechanism and an equipment lock/release mechanism and is detachably connected to a vehicle.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENTS

Now, a lock structure for vehicle-mounted type electronic equipment according to the present invention will be described hereinafter with reference to FIGS. 5 to 11, wherein like reference numerals designate like or corresponding parts throughout.

Figures 5, 6:
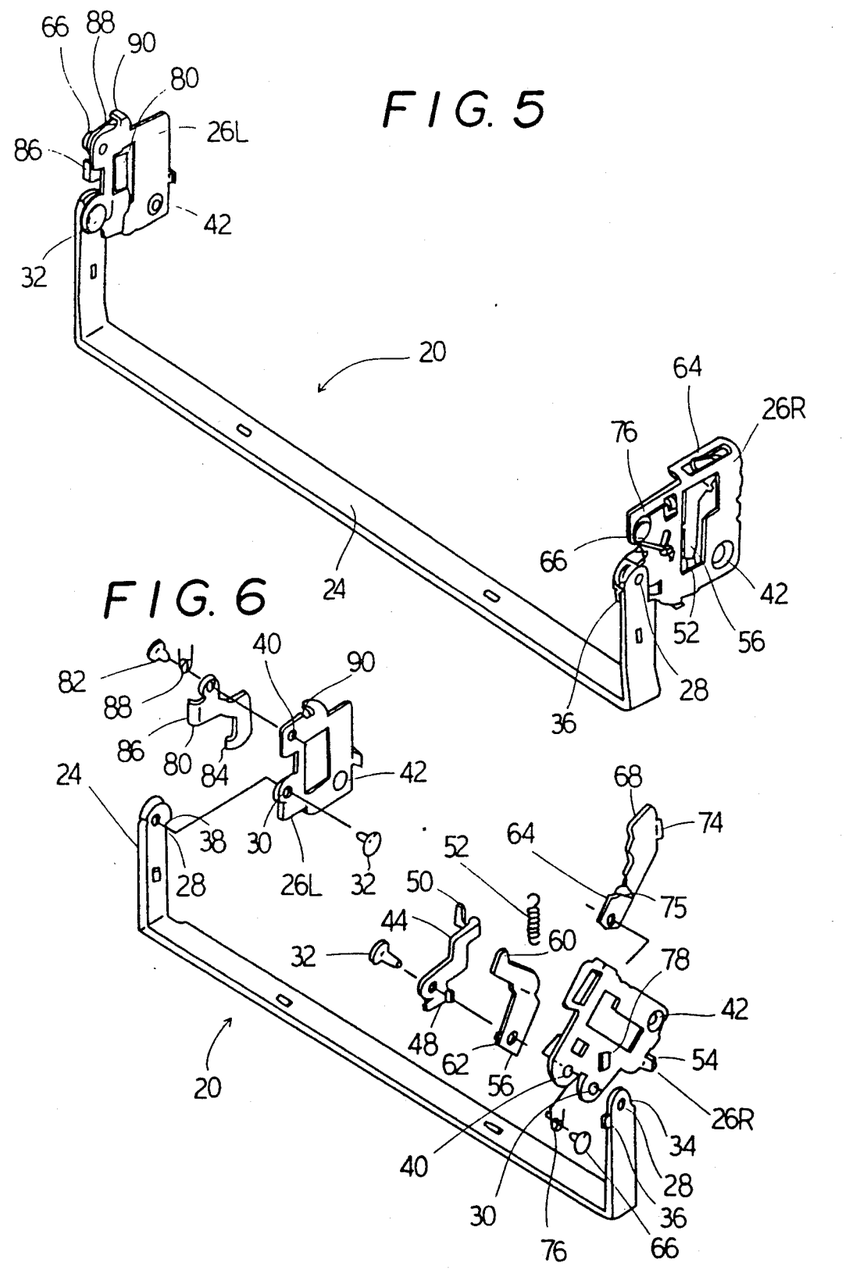
FIG. 5 is a perspective view showing an embodiment of a lock structure for vehicle-mounted type electronic equipment according to the present invention.
FIG. 6 is an exploded perspective view of the lock structure shown in FIG. 5.

FIGS. 5 to 10 show an embodiment of a lock structure for vehicle-mounted type electronic equipment according to the present invention. A lock structure of the illustrated embodiment, as shown in FIGS. 5 and 6, includes a handle unit 20, which is adapted to carry out both the lock/release function of a vehicle-mounted type electronic equipment and that of a handle function and to be detachably mounted on a body 22 of the equipment. The handle unit 20 includes a handle 24 and a pair of left and right side plates 26L and 26R each serving as a handle mounting plate. The handle 24 is formed at both ends thereof with engagement holes 28 and the side plates 26L and 26R each are formed at the end thereof with an engagement hole 30. The handle 24 and side plates 26L and 26R are pivotally connected together by means of pins 32 inserted through the engagement holes 28 and 30, so that the handle 24 may be pivotally supported between the side plates 26L and 26R.

The handle 24 is formed on the inner and outer sides of the proximal portion thereof pivotally supported on the right side plate 26R with a cutout 34 and a projection 36, respectively. Also, the handle 24 is formed on the inner side of the proximal portion thereof pivotally supported on the left side plate 26L with a projection 38. In addition, the left and right side plates 26L and 26R each are formed at the portion thereof in proximity to the engagement hole 30 with a through-hole 40. Further, the side plates 26L and 26R each are provided at the end thereof opposite to the engagement hole 30 with a mounting hole 42, in which a screw (not shown) is fitted to fix the handle unit 20 on the equipment body 22.

Figure 7A:
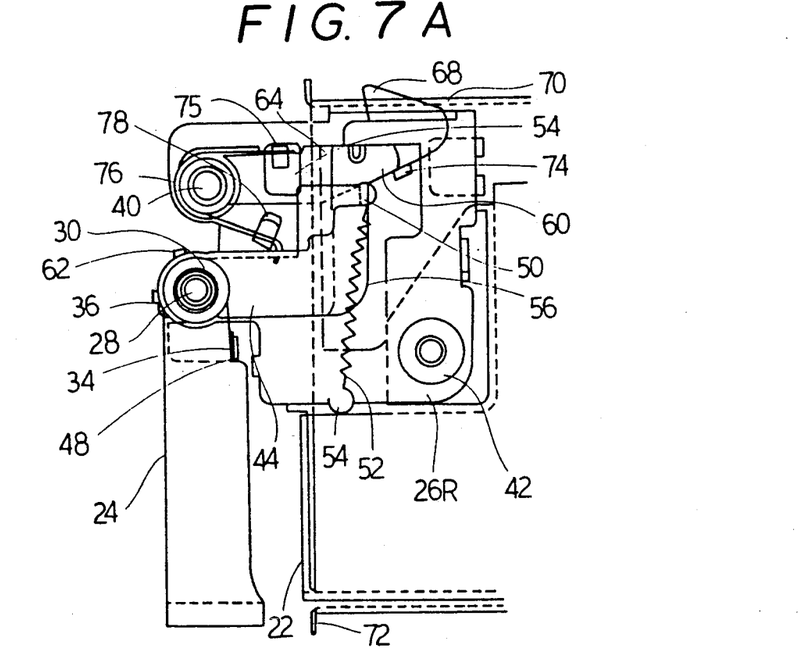
FIG. 7A is a right side elevation view of the lock structure shown in FIG. 5 wherein a handle is at a position of non-use.

As shown in FIG. 7A as well as FIG. 6, to the right side plate 26R is pivotally connected a slide plate 44 through a pin 32 inserted through the engagement hole 30. The slide plate 44 is formed at the proximal portion thereof with an engagement pawl 48 adapted to abut against the cutout 34 of the handle 24. Also, the slide plate 44 is provided at the distal end thereof with a projection 50, which is engaged with one end of a slide plate spring 52. The slide plate spring 52 is fixed at the other end thereof to a projection 54 provided on the right side plate 26R, to thereby force the engagement pawl 48 of the slide plate 44 in a forward direction (or in a side hand direction in FIG. 7A).

Figure 10:
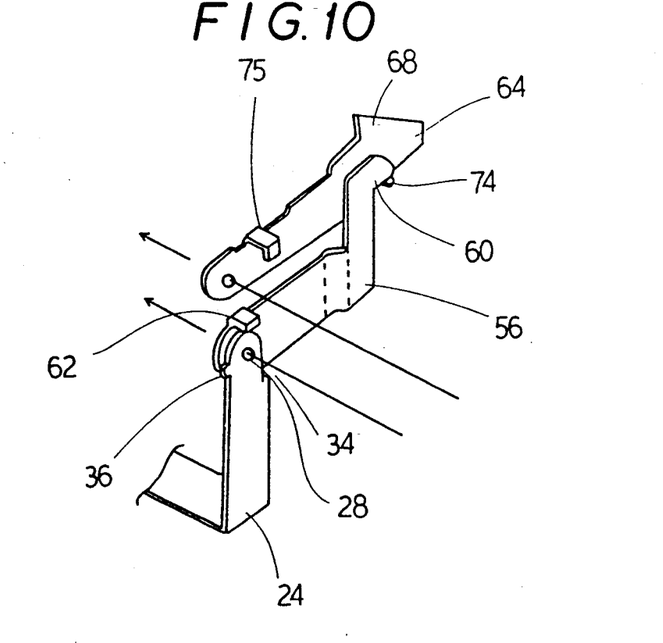
FIG. 10 is a perspective view showing an essential part of the lock structure shown in FIG. 5.

Also, as shown in FIGS. 7A and 10, to the right side plate 26R is connected a release plate 56 through the pin 32 inserted through the engagement hole 30 of the side plate 26R. The release plate 56 acts as a means for unlocking the equipment. The release plate 56 is arranged between the slide plate 44 and the right side plate 26R and formed at the distal end thereof with an engagement pawl 60. Further, the release plate 56 is provided at the proximal portion thereof with a projection 62. Against the projection 62 is abutted the projection 36 of the handle 24 when the handle 24 is pivotally moved to a substantially horizontal position. In addition, on the right side plate 26R is pivotally mounted an equipment hook plate 64 by means of a pin 66 inserted via the through-hole 40. The equipment hook plate 64 serves as an equipment lock means and is provided at the distal end thereof with an engagement pawl 68. The engagement pawl 68 is upward obliquely formed and adapted to be engaged with a holding hole 70 of an inner casing 72. The equipment hook plate 64 is formed at the lower portion of the distal end thereof with a projection 74, against which the engagement pawl 60 of the release plate 56 is downwardly abutted. The equipment hook plate 64 is formed at the upper portion of the proximal portion thereof with a projection 75, with which an equipment hook spring 76 is engaged at one end thereof. The equipment hook spring 25 is fixed at the other end thereof to a projection 78 formed at the right side plate 26R, to thereby constantly urge the equipment hook plate 64 in the direction of the engagement hole 70.

Figure 7B:
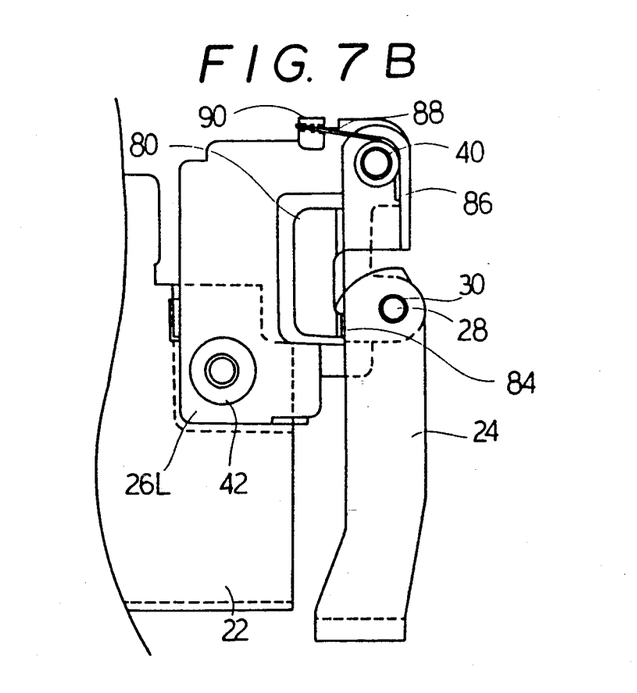
FIG. 7B is a left side elevation view of the lock structure shown in FIG. 5 wherein a handle is at a position of non-use.

On the left side plate 26L, as shown in FIG. 7B, a handle hook plate 80 is pivotally mounted in a direction parallel to the handle 24 through a pin 82 inserted via the through-hole 40. The handle hook plate 80 functions as a handle lock/release means and is provided at the lower end thereof with an engagement pawl 84 engaged with the cutout 38 of the handle 24. Also, the handle hook plate 80 is provided at the portion thereof near the proximal portion thereof with a press section 86 in a manner to be positioned on the front surface of the equipment body 22. On the pin 82 through which the handle hook plate 80 is connected to the side plate 26L is fitted a handle hook spring 88, which serves to forward urge the handle hook plate 80. The handle hook spring 88 is supported at one end thereof on a projection 90 of the left side plate 26L and abutted at the other end thereof against the inside of the projection 86 of the handle hook plate 80.

The remaining part of the illustrated embodiment may be constructed in substantially the same manner as the prior art described above.

Now, the manner of operation of the lock structure of the illustrated embodiment described above will be described hereinafter.

Figure 8A:
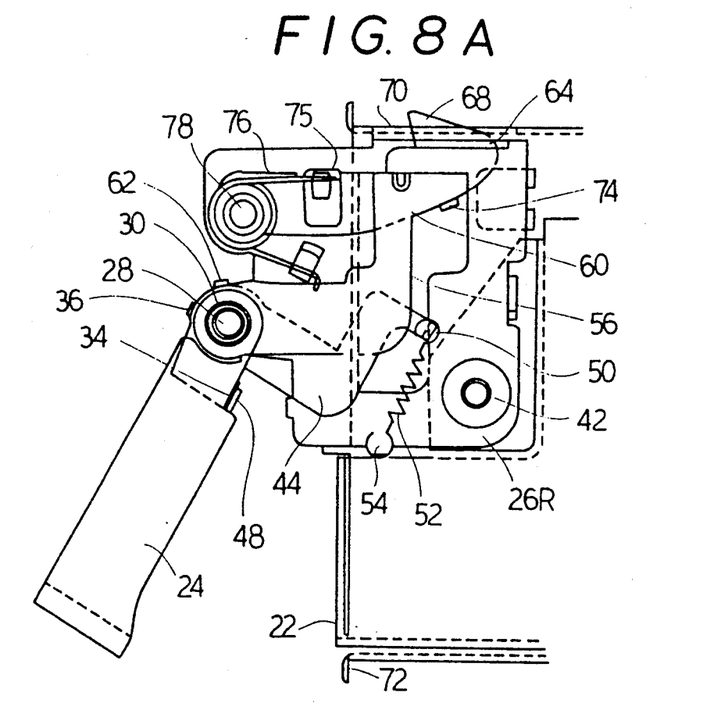
FIG. 8A is a right side elevation view of the lock structure shown in FIG. 5 wherein a handle is at an oblique position.
Figure 8B:
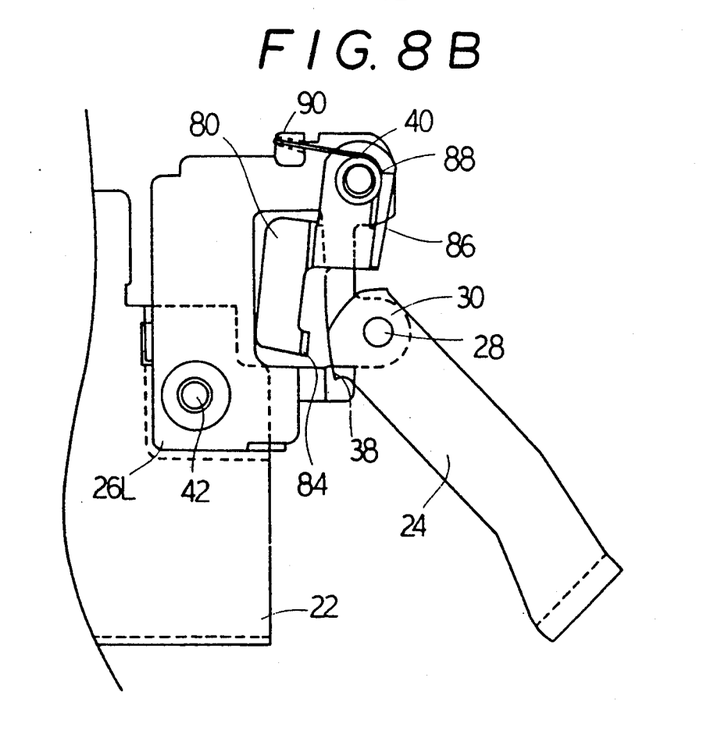
FIG. 8B is a left side elevation view of the lock structure shown in FIG. 5 wherein a handle is at an oblique position.

First, the removal of the equipment body 22 from the inner casing 72 will be described. The handle 24 is first unlocked. When the press section 86 of the handle hook plate 80 is pressed as shown in FIGS. 7A and 8B, the handle hook plate 80 is rearward pivotally moved to move the engagement pawl 84 in a released direction, resulting in the engagement pawl 84 being released from the cutout 38 of the handle 24. This causes the handle 24 to be unlocked, so that the slide plate spring 52 acts on the engagement pawl or projection 48 of the slide plate 44 abutted against the cutout 34 of the handle 24 as shown in FIGS. 7A and 8A, resulting in the handle 24 being pivotally moved in the forward direction.

Figure 9:
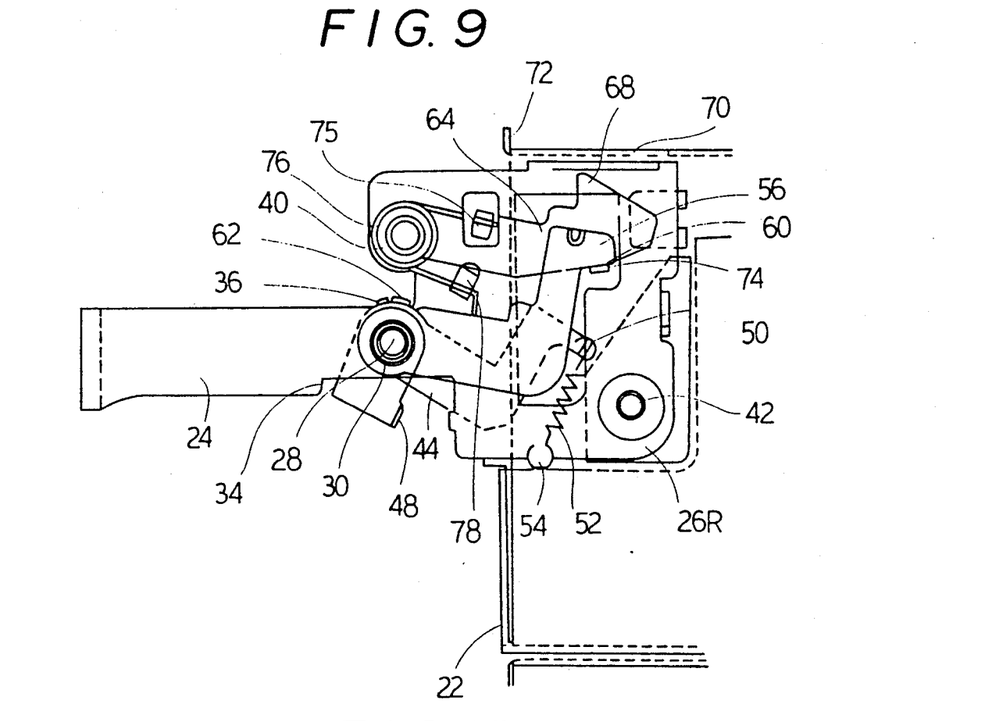
FIG. 9 is a right side elevation view of the lock structure shown in FIG. 5 wherein a handle is at a position of use.

Then, the equipment body 22 is unlocked. More particularly, the handle 24 is upward pivotally moved to the horizontal position as shown in FIG. 9. At this time, the projection 36 of the handle 24 rearward abuts against the the projection 62 of the release plate 56 to press it. This causes the release plate 56 to be downward pivotally moved, so that the engagement pawl 60 of the release plate 56 pushes down the projection 74 of the equipment hook plate 64, so that the engagement pawl 68 of the equipment hook plate 64 may be released from the holding holes 70 of the inner casing 72. Then, the handle 24 is forward pulled to draw the equipment body 22 out of the inner casing 72.

Thus, the release plate 56 is actuated only after the handle 24 is pivotally moved to the substantially horizontal position. This effectively prevents any pivotal movement of the handle 24 by a slight amount due to vibration of a vehicle from unlocking the equipment body 22 from the vehicle, to thereby keep the equipment body positively locked.

Now, the mounting of the equipment body 22 in the inner casing 72 will be described hereinafter.

When the equipment body 22 is inserted in the inner casing 72, the engagement pawl 68 of the equipment hook plate 64 abuts against the front surface of the inner casing 72. At this time, the elastic force of the equipment hook spring 76 causes the equipment hook plate 64 to be lowered toward the equipment body 22. The engagement pawl 68 of the equipment hook plate 64 is obliquely formed, therefore, the insertion is smoothly carried out. Then, when the engagement pawl 68 of the equipment hook plate 64 is positioned below the holding holes 70 of the inner casing 72, the equipment hook spring 76 causes the engagement pawl 68 to be engaged with the holding holes 70, to thereby lock the equipment body 22 in the inner casing 72.

Thus, it will be noted that the illustrated embodiment not only facilitates the mounting of the equipment body 22 in the inner casing 72 but ensures the locking of the equipment body 22 in the inner casing 72 through the holding holes 70.

At this time, the urging force of the slide plate spring 52 acts on the handle 24 through the slide plate 44, so that the handle 24 may be kept slanted. Then, when the handle 24 is pivotally moved toward the equipment body 22, the projection 38 of the handle 24 is engaged with the engagement pawl 84 of the handle hook plate 80, resulting in the handle 24 being effectively locked.

As described above, the illustrated embodiment is so constructed that the handle hook plate 80 serving as the handle lock/release means is arranged on the side of the left side plate 26L. Thus, the mounting and removal of the handle unit 20 with respect to the equipment body 22 permits the mounting and removal of a lock/release mechanism of the handle 24 with respect to the equipment body 22 to be readily carried out. This permits the lock/release mechanism of the handle 24 to be readily mounted on existing electronic equipment. Accordingly, even in electronic equipment which is not equipped with the lock/release mechanism of the handle 24, the replacement including an escutcheon is not required. Also, this permits the handle unit 20 to be manufactured and sold in the form of a kit product, resulting in economical advantages being attained.

Also, in the illustrated embodiment, the release plate 56 is constructed so as to directly exhibit elasticity, so that the fixing of the release plate 56 coaxial with the handle 24 may be facilitated. Also, the equipment hook plate 64 is upward urged by the equipment hook spring 76 provided coaxial with the plate 64. However, the mounting of both elements is facilitated because any other components are not coaxially arranged, Thus, the illustrated embodiment permits the assembling operation to be readily carried out, to thereby reduce the manufacturing costs.

Further, in the illustrated embodiment, the engagement pawl 60 of the release plate 56 for downward forcing of the equipment hook plate 64 is significantly spaced away from a position at which the equipment hook spring 76 applies force to the equipment hook plate 64, resulting in the equipment hook plate 64 being pushed down by force of a relatively small magnitude. Also, the release plate 56 is pushed down in proximity to a position about which the handle 24 is pivotally moved, so that the amount of movement of the engagement pawl 60 may be increased irrespective of the amount of movement of the projection 62 being small, to thereby contribute to small-sizing of the lock structure.

In the above-described embodiment, for the purpose of simplifying the construction of the lock structure, the left and right side plates 26L and 20R are provided with the handle lock/release mechanism and equipment lock/release mechanism, respectively. However, the present invention is not limited to such construction. For example, the present invention may be so constructed that only one of both side plates 26L and 26R is provided with both equipment lock/release mechanism and handle lock/release mechanism.

The illustrated embodiment includes the release plate 56 supported coaxial with the handle 24 and the slide plate 44 mounted on the handle 24 so as to urge the release plate 56 in a release direction when the handle 24 is pivotally moved to the substantially horizontal position. Alternatively, the present invention may be constructed in such a manner as shown in FIG. 11.

Figure 11:
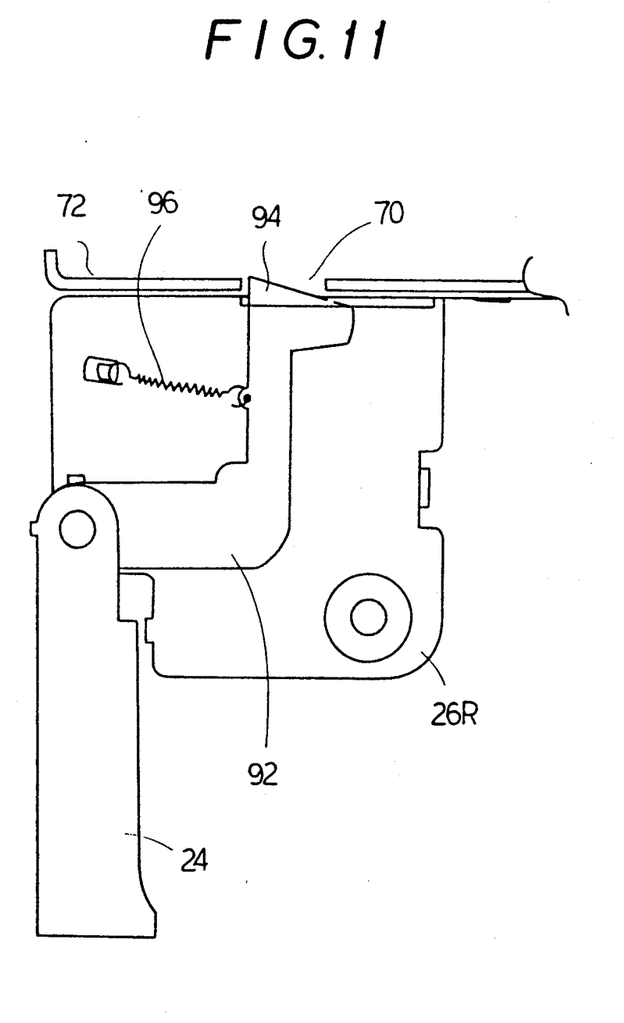
FIG. 11 is a right side elevation view showing another embodiment of a lock structure for vehicle-mounted type electronic equipment according to the present invention.

In an embodiment shown in FIG. 11, a release hook plate 92 is arranged. The release hook plate 92 is formed by upwardly extending the release plate 56 in the abovedescribed embodiment and is provided with holding pawls 94 for engagement with holding holes 70 of an inner casing 72. To the release hook plate 92 is operatively connected a spring 96, which acts to urge the release hook plate 92 in a counterclockwise direction. The remaining part of the embodiment may be constructed in substantially the same manner as the above-described one.

The so-constructed embodiment of FIG. 11 eliminates members such as the equipment hook plate or the like employed in the above-described embodiment, to thereby simplify the construction and reduce the manufacturing costs.

Further, the present invention, as described above, may be so constructed that the single handle lock/release means is provided on the detachable handle mounting plate. In this instance, the equipment lock/release mechanism may be varied as desired.

As can be seen from the foregoing, the lock structure of the present invention includes the equipment lock means, the elastic member for urging the equipment lock means in the direction of the held section on the vehicle, and the equipment lock release means provided on the handle so as to force the equipment lock means in the released direction when the handle is pivotally moved to a substantially horizontal position. Thus, such construction of the lock structure of the present invention permits the electronic equipment to be locked on the vehicle by simply mounting the equipment body on the vehicle, irrespective of the angle of the handle. Also, in the present invention, the equipment lock release means is not actuated unless the handle is at substantially the horizontal position, to thereby prevent the electronic equipment from being unlocked due to the pivotal movement of the handle by any slight amount caused by vibration of a vehicle.

Also, the lock structure of the present invention may be so constructed that the handle mounting plates for pivotally supporting are provided with the single handle lock/release means. Such construction significantly decreases the number of parts for the lock structure, to highly simplify the assembling operation and reduce the manufacturing costs. Also, the handle mounting plates may be detachably mounted on the equipment body. This permits the handle lock/release mechanism to be applied to any kind of electronic equipment.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A lock structure for a vehicle-mounted type of electronic equipment comprising:
   a handle;
   a handle mounting device for pivotally mounting said handle on the front portion of the vehicle mounted type of electronic equipment between a storage position and an extended operator carry position;
   said handle mounting device including a handle lock-release mechanism for locking the handle to the electronic equipment and a separate equipment lock-release mechanism for locking the electronic equipment to a vehicle;
   means for releasing the handle lock-release mechanism to enable movement of the handle, while retaining the equipment lock/release mechanism in a locked position, and
   means for activating the equipment lock-release mechanism only after the handle has moved from the storage position towards the extended operator carry position,
   said handle mounting device being detachably connected to a vehicle.

2. A lock structure as defined in claim 1, wherein said equipment lock/release mechanism includes a release plate and an equipment hook plate pivotally connected to said handle; and
   said handle lock/release mechanism includes a handle hook plate pivotally connected to said handle.

3. A lock structure as defined in claim 2, wherein said equipment lock/release mechanism and handle lock/release mechanism is connected to said handle through separate mounting plate means.

4. A lock structure as defined in claim 3, wherein said mounting plate means comprise a pair of side plates pivotally connected to both ends of said handle.

5. A lock structure as defined in claim 1, wherein said handle mounting device is detachably mounted on the electronic equipment.

6. A lock structure as defined in claim 1, wherein said handle lock/release mechanism is detachably arranged.

7. A lock structure for a vehicle-mounted type of electronic equipment comprising:
   a handle pivotally mounted on the front portion of the vehicle-mounted type electronic equipment;
   a holding section on a side portion of a vehicle formed in an opening provided on the side portion of the vehicle;
   an equipment lock means provided on the side surface of the vehicle-mounted electronic equipment so as to be engaged with said vehicle holding section and movable in a released direction;
   an elastic element for constantly urging said equipment lock means in a direction towards said vehicle holding section; and
   an equipment lock release means provided on said handle so as to force said equipment lock means in the released direction, said equipment lock/release means being activated only after said handle has been pivotally moved to a substantially horizontal position;
   whereby the electronic equipment is unlocked from the vehicle, and can be detached from the vehicle, when said handle is moved to the substantially horizontal position.

8. A lock structure for vehicle-mounted type of electronic equipment comprising:
   a handle pivotally mounted on the front portion of the vehicle-mounted type of electronic equipment for movement between a storage position and an extended operator carry position;
   a holding section on a side of said handle formed on said handle;
   a pair of handle mounting plates including a support for pivotally mounting said handle thereon and a mounting means for mounting said handle on the sides of the electronic equipment;
   a handle lock/release means provided on at least one of said handle mounting plates and constantly urged in a direction towards said holding section, said handle lock/release means being movable in a released direction; and
   a bias element for forwardly urging said handle position on the front side of the electronic equipment towards said operator carry position, said bias element being provided on at least one of said handle mounting plates and capable of moving the handle towards said operator carry position but not to a fully extended operator carry position when said handle lock/release means is activated.

9. In a combination outer casing and inner electronic housing member for mounting within an aperture of a support frame such as a vehicle, the inner housing member being removably mounted within the outer casing, the improvement comprising:
   a handle member movably mounted to the inner housing member to provide a first position capable of supporting the inner housing member independent of the outer casing for transportation purposes, and a second position for storage;
   a first locking means operatively connected to handle member and capable of fixedly engaging the outer casing for retention of the inner housing member within the outer casing;
   a second locking means operatively connected to the handle member and capable of securely maintaining the handle member in the storage position after the inner housing member is mounted within the casing;
   operator actuated means for releasing the second locking means, while retaining the first locking means in a locked condition, whereby movement of the handle member from a storage position towards an extended transportation position will release the first locking means, and
   means for biasing the handle member to a position between the transportation position and the storage position to facilitate operator mounting of the inner housing electronic member in the outer casing, the first locking means being in a locked condition at that position and only released when an operator further moves the handle member towards the transportation position.

10. The invention of claim 9 further including a release plate, wherein the handle member is pivotally mounted, and the first locking means is interconnected to the handle member by the release plate, and means on the release plate and handle member to interact only after a predetermined movement of the handle member from its storage position.

11. The invention of claim 10 wherein the predetermined movement is a pivotal movement of the handle member to substantially a horizontal position extending outward from the inner electronic housing member at almost its furthest extended position.

12. The invention of claim 11 wherein the operator actuated means includes an engagement pawl, a hook plate, and a cutout position of the handle member, the engagement pawl being pivotally mounted and the hook plate having a press section whereby activation of the press section by the operator causes the engagement pawl to disengage from the cutout position and to release the handle member.

* * * * *